US009532186B2

United States Patent
Hsu et al.

(10) Patent No.: US 9,532,186 B2
(45) Date of Patent: Dec. 27, 2016

(54) BIDIRECTIONAL VOICE TRANSMISSION SYSTEM AND METHOD THEREOF

(71) Applicant: NATIONAL CHUNG SHAN INSTITUTE OF SCIENCE AND TECHNOLOGY, Taoyuan (TW)

(72) Inventors: Tung-Jung Hsu, Taoyuan (TW); Yu-San Lin, Taoyuan (TW); Tain-Wen Suen, Taoyuan (TW); Jen-Chi Liao, New Taipei (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 511 days.

(21) Appl. No.: 14/076,255

(22) Filed: Nov. 10, 2013

(65) Prior Publication Data

US 2015/0131490 A1    May 14, 2015

(51) Int. Cl.
| | |
|---|---|
| H04W 4/06 | (2009.01) |
| H04L 1/00 | (2006.01) |
| H04W 4/00 | (2009.01) |
| H04W 72/02 | (2009.01) |

(52) U.S. Cl.
CPC ............... *H04W 4/06* (2013.01); *H04L 1/00* (2013.01); *H04W 4/001* (2013.01); *H04W 72/02* (2013.01)

(58) Field of Classification Search
None
See application file for complete search history.

(56) References Cited

U.S. PATENT DOCUMENTS

| | | | | |
|---|---|---|---|---|
| 6,404,772 | B1* | 6/2002 | Beach | H04L 12/5693 370/338 |
| 7,031,293 | B1* | 4/2006 | Srikrishna | H04K 3/226 370/348 |
| 2003/0027546 | A1* | 2/2003 | Kobayashi | H04W 8/005 455/403 |
| 2011/0304503 | A1* | 12/2011 | Chintalapudi | G01S 11/06 342/357.29 |
| 2014/0057645 | A1* | 2/2014 | Chowdhary | H04W 4/08 455/456.1 |
| 2014/0112242 | A1* | 4/2014 | Vilmur | H04W 16/26 370/327 |

FOREIGN PATENT DOCUMENTS

IL    WO 2013069015 A1 *  5/2013 ............ H04W 72/02

* cited by examiner

*Primary Examiner* — Huy D Vu
*Assistant Examiner* — James P Duffy
(74) *Attorney, Agent, or Firm* — Anova Law Group, PLLC

(57) ABSTRACT

The present invention relates to a bidirectional voice transmission system and a method thereof, wherein the system timing of the system is divided into three time slots for carrying a control signal, a broadcast voice signal and a mobile device voice signal. The bidirectional voice transmission system is able to carry out the signal transmission by way of frequency frogging, so as to effectively avoid the signal interference from occurring between any two different signal transmitting and receiving devices. Besides, all of the mobile devices can be added into the bidirectional voice transmission system by way of dynamic building, without using any specific communication interface. The most important is that, the number of node routers can be expanded to about 65,000 in order to apply the bidirectional voice transmission system in a huge range network communication or a wild rescue field.

8 Claims, 13 Drawing Sheets

BIDIRECTIONAL VOICE TRANSMISSION SYSTEM AND METHOD THEREOF

BACKGROUND OF THE INVENTION

1. Field of the Invention

The present invention relates to a signal transmission method, and more particularly to a bidirectional voice transmission system consisting of a central console, a central router and a plurality of node routers as well as a method thereof.

2. Description of the Prior Art

Commercial broadcast equipment, such as microphones and megaphones, are divided into wireless transmission types and wire transmission types; however, when the commercial broadcast equipment is operated, there have noise voices frequently produced by signal interference because the signal transmission way of the commercial broadcast equipment is monodirectional. Besides the aforesaid primary drawback, the commercial broadcast equipment (especially the wireless broadcast equipment) further includes the shortcomings as follows:

(1) The conventional wireless voice transmission device, such as wireless intercom, transmits voice signal by single frequency hopping; however, to transmit voice signal by single frequency hopping would easily suffer the signal interference.

(2) Moreover, the signal transmission of the conventional wireless voice transmission device is limited by transmission distance, so that it must use routers to extend the signal transmission of the conventional wireless voice transmission device. However, when using a wifi router to extend the signal transmission, it must correspondingly use an access point for the wifi router. On the other hand, Bluetooth router includes its primary shortcoming of shorter transmission distance less than 10 m.

(3) Inheriting to above point 2, being limited by the maximum node numbers of the wifi routers and the Bluetooth routers are respectively 32 and 7, these two routers are not suitable for being applied in long-distance or broad-range signal transmission.

Through above descriptions, it is able to know that the conventional wireless voice transmission technology still includes many drawbacks and shortcomings; accordingly, the inventor of the present application has made great efforts to make inventive research thereon and eventually provided a bidirectional voice transmission system and a method thereof.

SUMMARY OF THE INVENTION

The primary objective of the present invention is to provide a bidirectional voice transmission system and a method thereof, in which, the system timing of the system is divided into three time slots for carrying a control signal, a broadcast voice signal and a mobile device voice signal outputted by a mobile device. The bidirectional voice transmission system is able to carry out the signal transmission by way of frequency frogging, so as to effectively avoid the signal interference from occurring between any two different signal transmitting and receiving devices. Besides, all of the mobile devices can be added into the bidirectional voice transmission system by way of dynamic building, without using any specific communication interface. The most important is that, the number of node routers can be expanded to abut 65,000 in order to apply the bidirectional voice transmission system in a huge range network communication or a wild rescue field.

Accordingly, to achieve the primary objective of the present invention, the inventor of the present invention provides a bidirectional voice transmission system, comprising:
  a center console;
  a central router, being coupled to the center console for transmitting a broadcast voice signal and a control signal received from the center console by a base frequency;
  a plurality of node routers, wherein a bidirectional and serial wireless transmission path is constructed by the center console, the central router and the node routers, such that the center console is able to transmit the control signal to each of the node routers for carrying out the setting and management of the node routers through a download-link serial wireless transmission path of the bidirectional and serial wireless transmission path; therefore, a first node router of the node routers can receive the broadcast voice signal transmitted by the central router, so as to transmit the broadcast voice signal transmitted to a second node router of the node routers by a first frequency; moreover, the second node router transmitting the broadcast voice signal transmitted to a third node router of the node routers by a second frequency; and
  a plurality of mobile devices, locating in a signal-covering range of the node routers, and at least having a registering unit and a speaking unit; wherein when one of the plurality of mobile devices is adjacent to any one of the node routers, the mobile device can output a register application to the central console by activating the registering unit, so as to make the mobile device be permitted joining the bidirectional and serial wireless transmission path; moreover, the mobile device is able to broadcast a mobile device voice signal or transmit the mobile device voice signal to a specified mobile device through the bidirectional and serial wireless transmission path.

For the aforesaid bidirectional voice transmission system, a system timing of the bidirectional voice signal transmission system is divided into three time slots for carrying the control signal, the broadcast voice signal and the mobile device voice signal; moreover, the central console would selects at least two frequencies from a system bandwidth for alternatively being as the base frequency; in addition, a central console position, a mobile device position and a node router position are defined by the central console, and the mobile device transmits the mobile device voice signal to the central console by a CSMA/CA (Carrier Sense Multiple Access with Collision Avoidance) network protocol.

Moreover, to achieve the primary objective of the present invention, the inventor of the present invention provides a bidirectional voice transmission method, comprising a plurality of steps of:

(1) making one mobile device join a bidirectional and serial wireless transmission path constructed by a center console, a central router and a plurality of node routers, wherein a mobile device signal transmitting and receiving frequency of the mobile device is synchronous with a router signal transmitting and receiving frequency of any one of the node routers adjacent to the mobile device;

(2) the mobile device receiving a control signal outputted by the central console through the adjacent node router, so as to complete the base setting for transmitting and receiving signal;

(3) activating a speak unit of the mobile device;
(4) determining whether a mobile device voice signal is a broadcast voice signal, if yes, proceeding to step (5); otherwise, proceeding to step (7);
(5) the mobile device transmitting a speak requesting signal, the mobile device voice signal, and a RSSI signal to the central console through a upload-link serial wireless transmission path of the bidirectional and serial wireless transmission path;
(6) the central console transmitting the mobile device voice signal to each of the node routers through a download-link serial wireless transmission path of the bidirectional and serial wireless transmission path, so as to make each of the mobile devices adjacent to the node routers be able to receive the mobile device voice signal; ending the method;
(7) the mobile device transmitting the speak requesting signal, the mobile device voice signal, and the RSSI signal to the central console through the upload-link serial wireless transmission path of the bidirectional and serial wireless transmission path; and
(8) the central console transmitting the mobile device voice signal to each of the node routers through the download-link serial wireless transmission path of the bidirectional and serial wireless transmission path, so as to make a specified mobile device adjacent to the node routers be able to receive the mobile device voice signal; ending the method.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a bidirectional voice transmission system and a method thereof according to the present invention, embodiments of the present invention will be described in detail with reference to the attached drawings hereinafter.

Figure 1A:
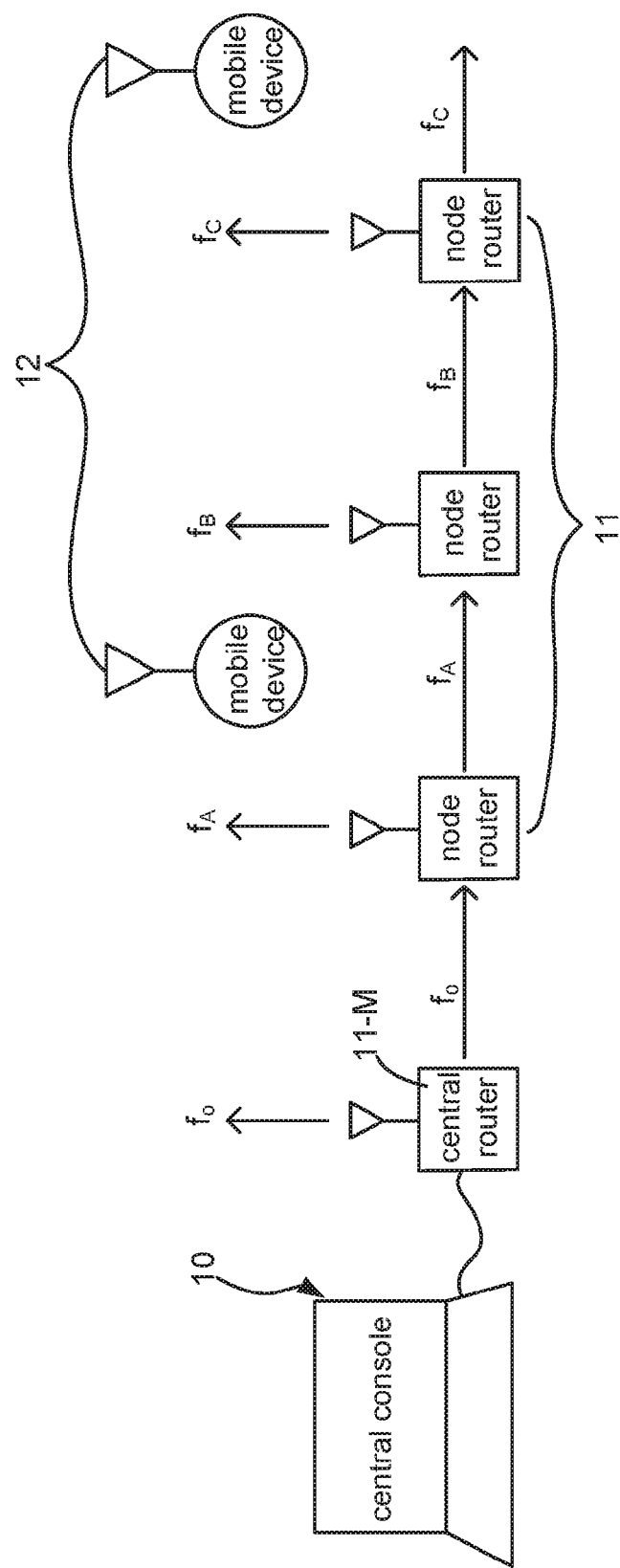
FIGS. 1A and 1B are framework views of a bidirectional voice transmission system according to the present invention.

With reference to FIG. 1A, which illustrates a framework view of a bidirectional voice transmission system according to the present inventions. As shown in FIG. 1A, the bidirectional voice transmission system 1 consists of: a central console 10, a plurality of node routers 11 and a plurality of mobile device 12, wherein the central console 10 used in the present invention can be a computer host, a notebook, a satellite communication vehicle, a base station, or a cloud server. In addition, although FIG. 1A merely depict three node routers 11 and three mobile devices 12, the number of the node routers 11 and the mobile devices 12 does not be limited to three. When practically applying the bidirectional voice transmission system 1 of the present invention, the number of the node routers 12 can be expanded to N according to signal-covering range; moreover, the number of the mobile devices 12 is dependent upon the total number of the mobile devices 12 joining the bidirectional voice transmission system 1.

Figure 1B:
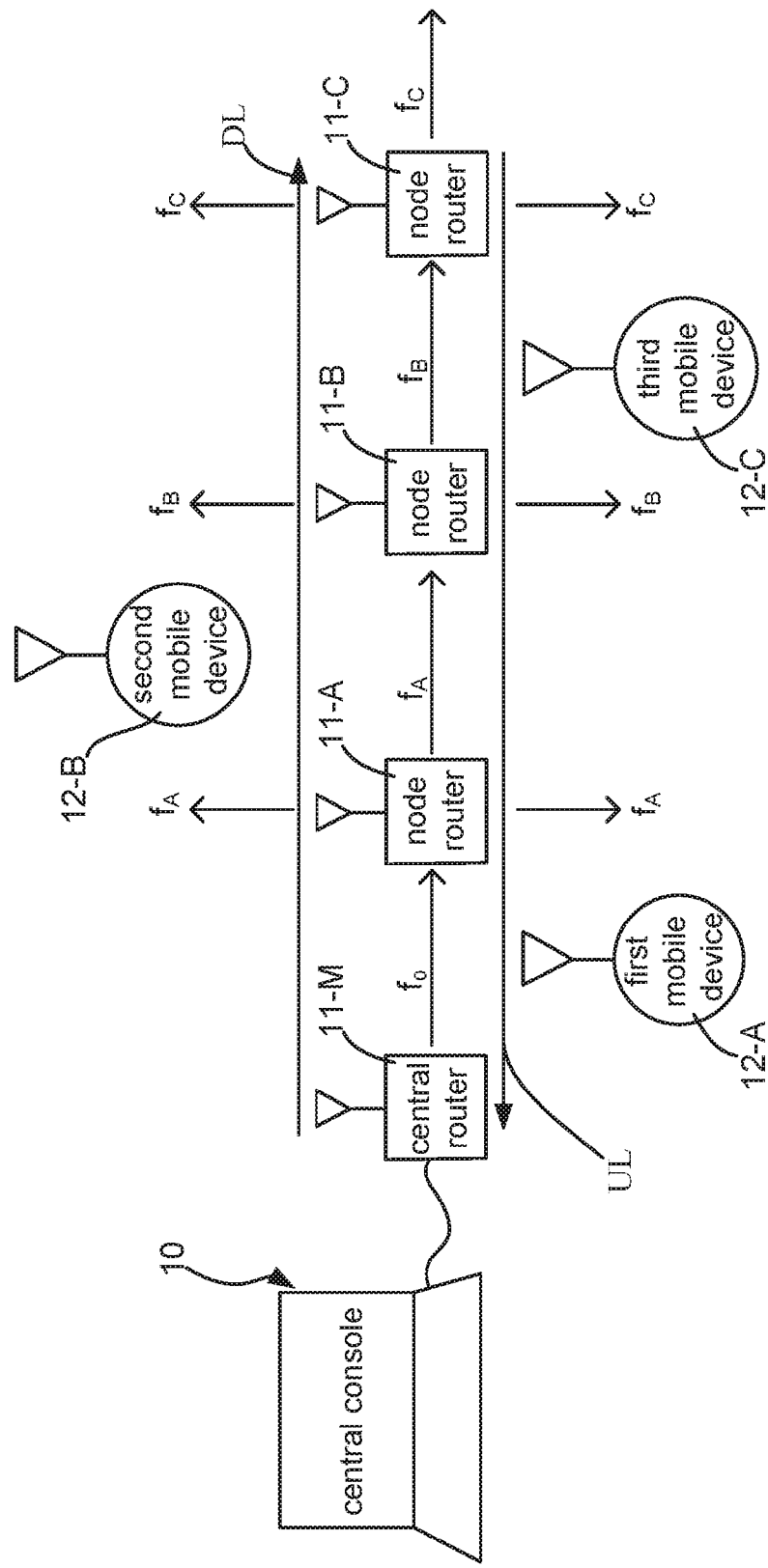
Figure 2:
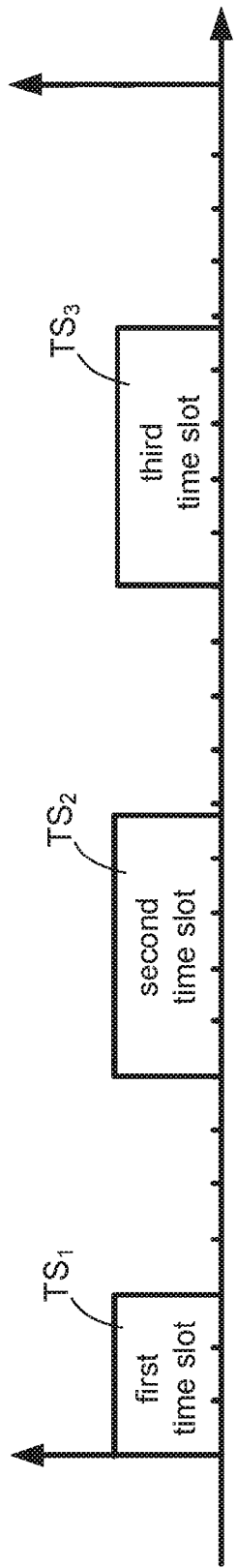
FIG. 2 is a system timing diagram of the bidirectional voice transmission system.

Continuously referring to FIG. 1A, and please refer to FIG. 1B and FIG. 2, which respectively illustrate the framework view and a system timing diagram of the bidirectional voice transmission system. As shown in FIG. 2, the system timing of the bidirectional voice signal transmission system 1 is divided into three time slots, so as to use a first time slot $TS_1$, a second time slot $TS_2$ and a third time slot $TS_3$ for respectively carrying a control signal and a broadcast voice signal outputted by the central console 10, as well as a mobile device voice signal outputted by the mobile device 12. Therefore, a first mobile device 12-A, such as a mobile phone, a wireless intercom, a tablet PC, or a notebook, locating in the signal-covering range of a first node router 11-A is able to receive the signal transmitted by the first node route 11-A; Similarly, a second mobile device 12-B (a third mobile device 12-B) locating in the signal-covering range of a second node router 11-B (a third node router 11-C) is able to receive the signal transmitted by the second node router 11-B (the third node router 11-C). Moreover, the most important is that, the first node router 11-A outputs the signal by a first frequency $f_A$ in order to effectively avoid the signal interference from occurring between any two different signal transmitting and receiving devices. The same to the first router 11-A, the second node router 11-B (the third node router 11-C) outputs the signal by a second frequency $f_B$ (a third frequency $f_C$.)

Inheriting to above descriptions, the central console 10 is coupled with a central router 11-M, so as to output the control signal and the broadcast voice signal by a base frequency $f_0$ through the central router 11-M. Particularly, in the present invention, the central console 10 would select at least two frequencies from a system bandwidth for alternatively being as the base frequency $f_0$ in order to prevent the base frequency $f_0$ from suffering signal interference, and ensure that the control signal and the broadcast voice signal outputted by the central console can by transmitted to the first node router 11-A through the central console 11-M.

Particularly, in the present invention, a bidirectional and serial wireless transmission path is constructed by the center console 10, the central router 11-M and the node routers 11, wherein the wireless transmission mode used by the bidirectional and serial wireless transmission path can be WIFI, Bluetooth or Zigebee. Therefore, the center console 10 is able to transmit the control signal to each of the node routers 11 for carrying out the setting and management of the node routers 11 through a download-link serial wireless transmission path DL of the bidirectional and serial wireless transmission path. So that, a first node router 11-A of the node routers 11 can receive the broadcast voice signal transmitted by the central router 11-M, so as to transmit the broadcast voice signal transmitted to a second node router 11-B of the node routers 11 by a first frequency $f_A$. Similarly, the second node router 11-B can further transmits the broadcast voice signal transmitted to the next node router (i.e., the third node router 11-C) of the node routers 11 by a second frequency $f_B$.

Figure 3:
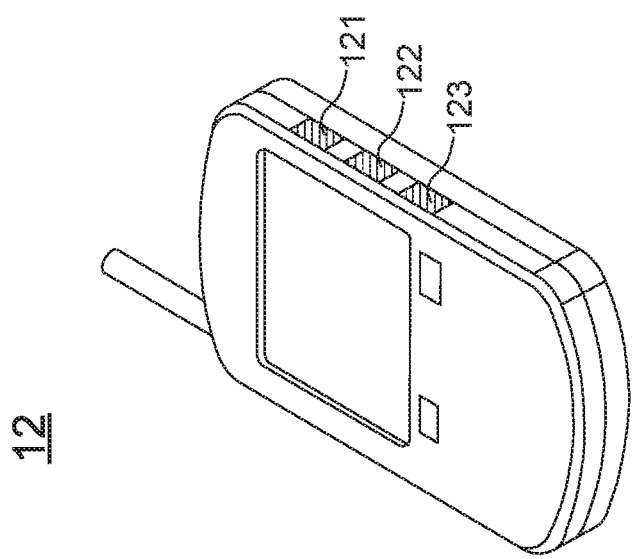
FIG. 3 is a stereo view of a mobile device.

Please simultaneously refer to FIG. 3, there is shown a stereo view of a mobile device. In the present invention, each mobile device 12 at least includes a registering unit 121, a speaking unit 122 and an emergency unit 123. Through the system framework of FIG. 1A and FIG. 1B as well as the design of the time slots shown in FIG. 2, when one of the plurality of mobile devices 12 is adjacent to any one of the plurality of node routers 11, the mobile device 12 can output a register application to the central console 10 by activating the registering unit 121, so as to make the mobile device 12 be permitted joining the bidirectional and serial wireless transmission path; moreover, the mobile device 12 is able to unload a mobile device voice signal to the central console 10 through a upload-link serial wireless transmission path (UL) of the bidirectional and serial wireless transmission path.

Figure 4:
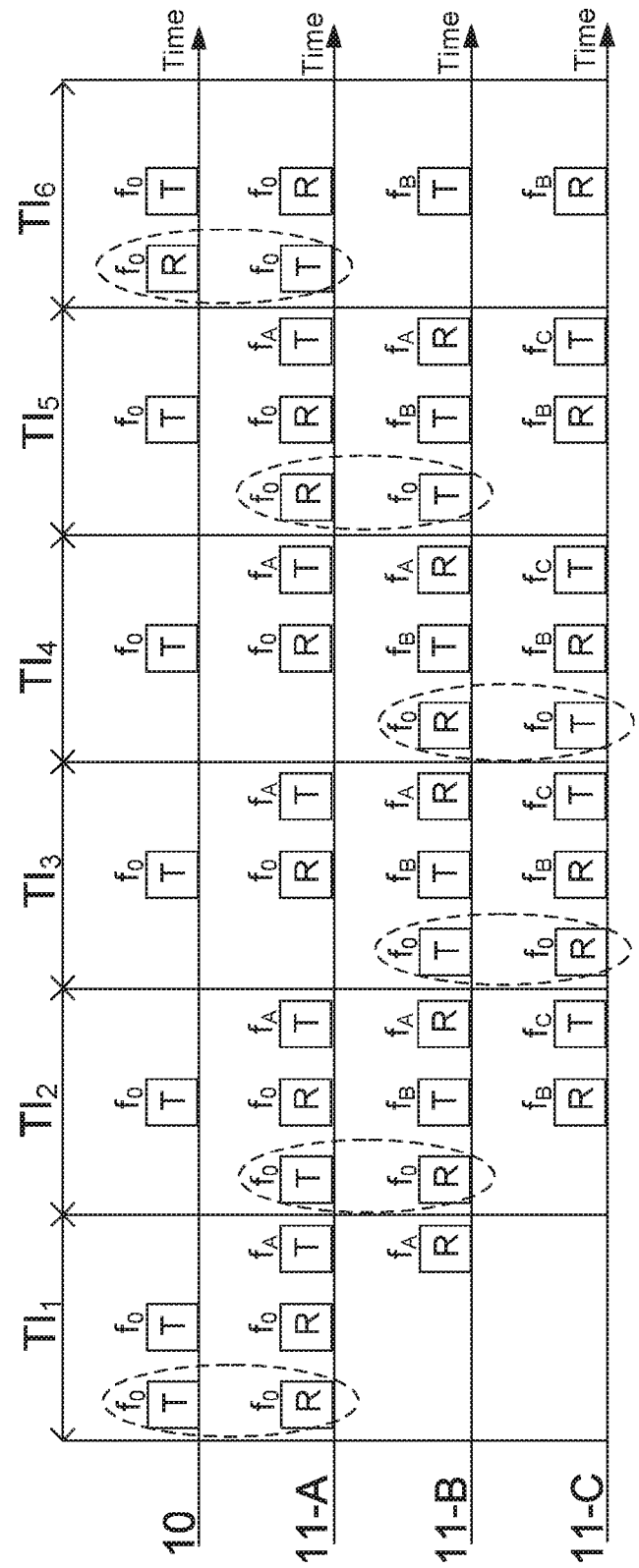
FIG. 4 is an overlapped system clock signal diagram of the bidirectional voice transmission system.

Thus, through above descriptions, the basic framework and the signal transmission way of the bidirectional voice signal transmission system 1 have been introduced completely and clearly. Next, the detailed technology features of the bidirectional voice signal transmission system 1 will be further introduce in following paragraphs. With reference to FIG. 4, there is shown an overlapped system clock signal diagram of the bidirectional voice transmission system. As shown in FIG. 4, in a first time interval $TI_1$ of the clock signal, the central console 10 transmits the control signal out by a base frequency $f_0$ through the central router 11-M, and the first node router 11-A receives the control signal at the same time. Subsequently, in a second time interval $TI_2$ of the clock signal, the first node router 11-A transmits the control signal to the second node router 11-B; moreover, the second node router 11-B transmits the control signal to the third node router 11-C in a third time interval $TI_3$ of the clock signal. Therefore, if the bidirectional voice transmission system 1 merely includes three node routers 11, the third node router 11-C would transmit a feedback signal to the second node router 11-B in a fourth time interval $TI_4$ of the clock signal after receiving the control signal. Then, in a fifth time interval $TI_5$ of the clock signal, the second node router 11-B transmits the feedback signal to the first router 11-A; and eventually, the first node router 11-A transmits the feedback signal to the central router 11-M and the central console 10. So that, the central console 10 would define the router positions of each of the node routers 11 after receiving the feedback signal.

Figure 5A:
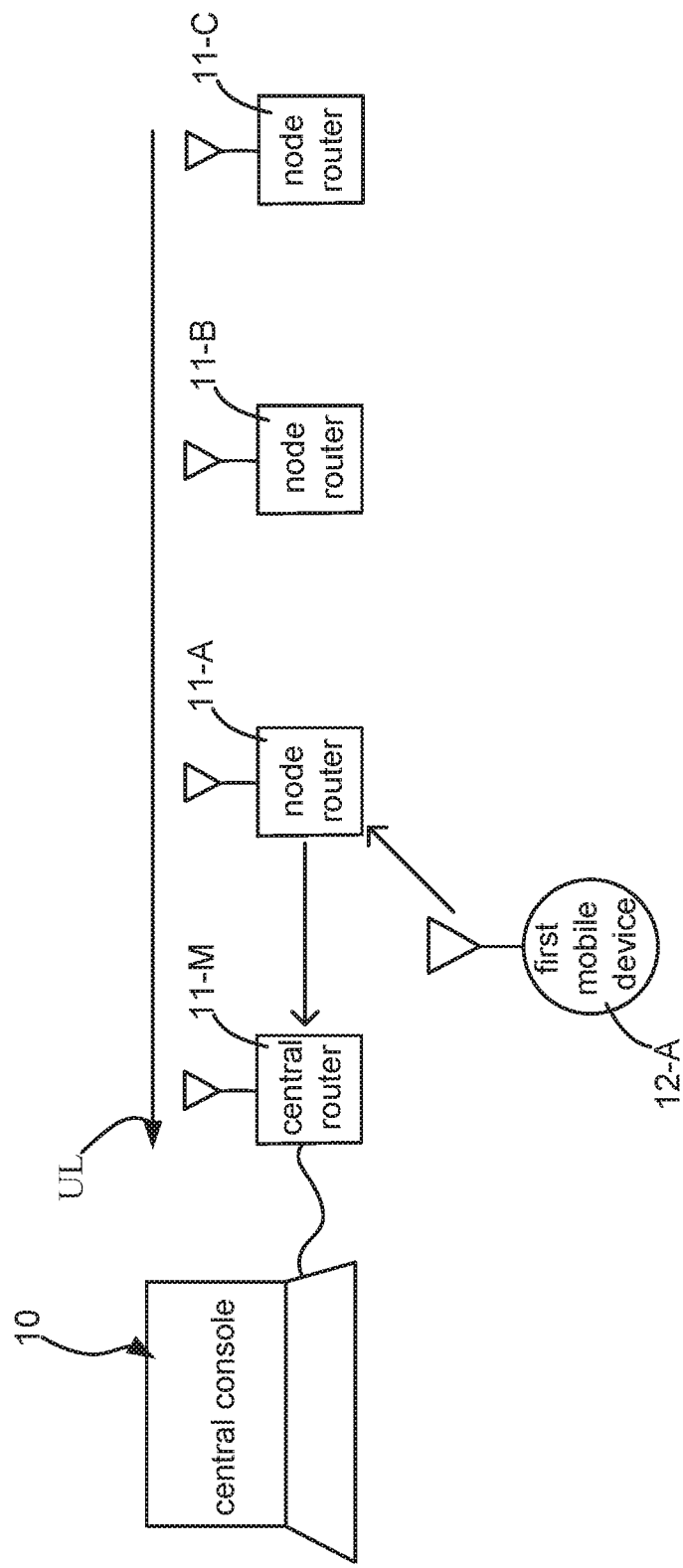
FIGS. 5A, 5B and 5C are framework views of the bidirectional voice transmission system.
Figure 5B:
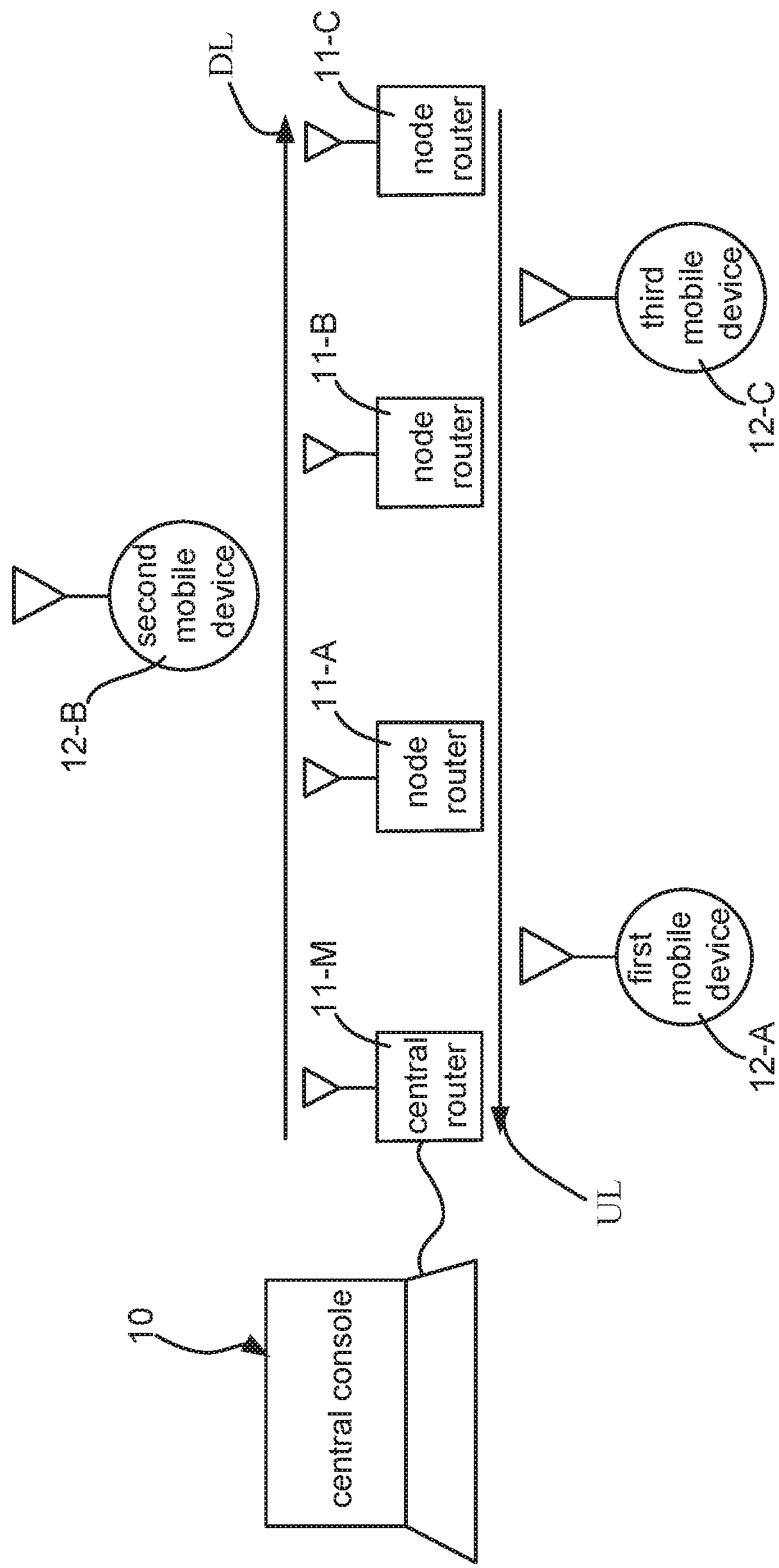

Continuously, please refer to FIG. 5A and FIG. 5B, there are shown Framework views of the bidirectional voice transmission system. As shown in FIGS. 5A and 5B, after a first mobile device 12-A enters the signal-covering range of the first node router 11-A and the first node router 11-A is confirmed to be the near distance node router of the first mobile device 12-A, the user is able to activate the registering unit 121 (as shown in FIG. 3) of the first mobile device 12-A, so as to unload a register application to the central console 10 through a upload-link serial wireless transmission path UL of the bidirectional and serial wireless transmission path. Therefore, the central console 10 would define a mobile device position for the first mobile device 12-A after receiving the register application. Similarly, as shown in FIG. 5B, a second mobile device 12-B and a third mobile device 12-C can also complete their register application by the same way, and then join the bidirectional and serial wireless transmission path constructed by the center console 10, the central router 11-M and the node routers 11.

Figure 5C:
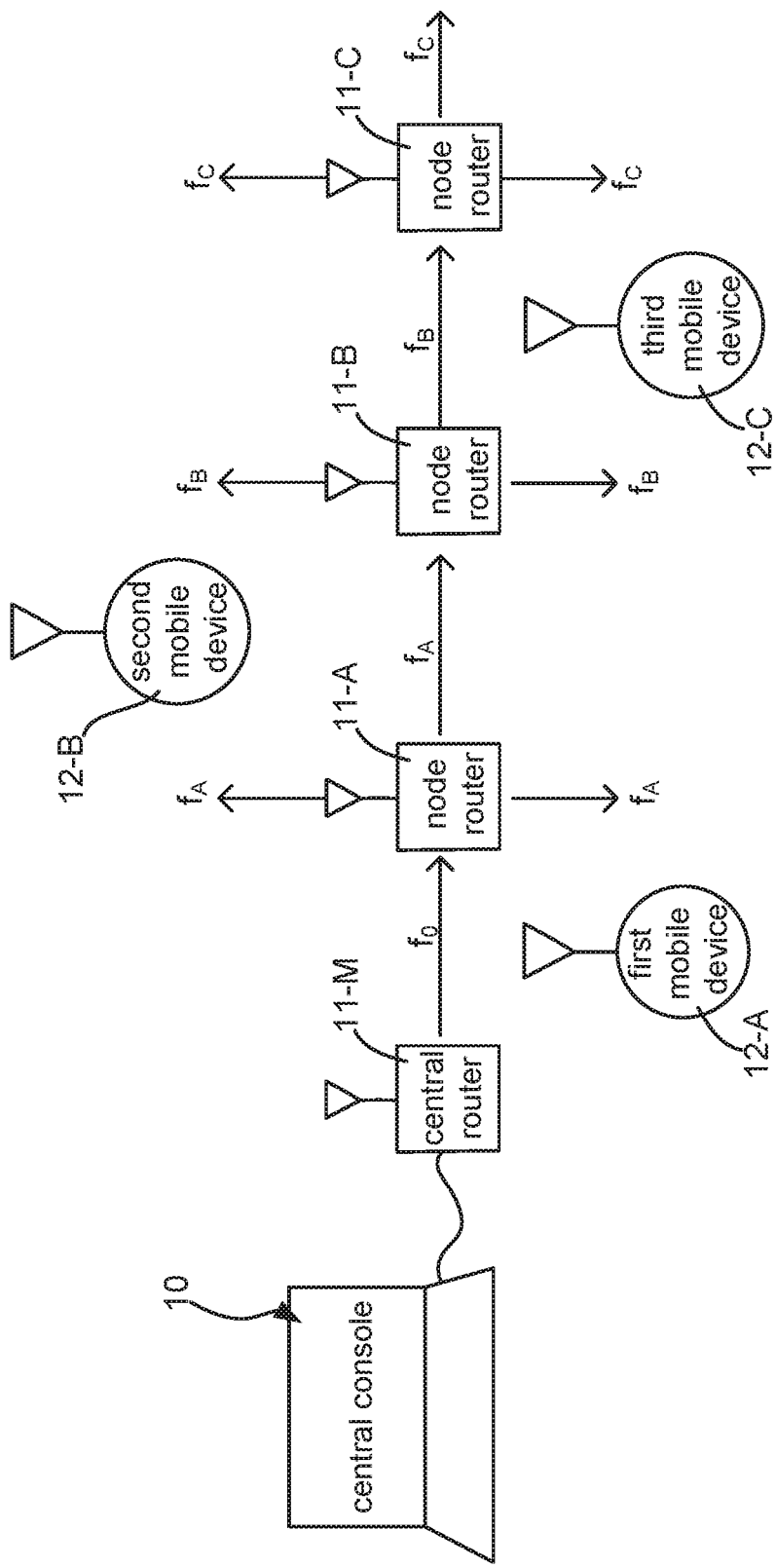

Please refer to FIG. 5C, which also illustrates the framework view of the bidirectional voice transmission system. As shown in FIG. 5C, the central console 10 transmits the broadcast voice signal by a base frequency $f_0$ through the central router 11-M, and then the first node router 11-A receives the broadcast voice signal, so as to further transmit the broadcast voice signal out by a first frequency $f_1$; meanwhile, not only the second node router 11-B would receive the broadcast voice signal outputted by the first node router 11-A, but the first mobile device 12-A adjacent to the first node router 11-A also receive the broadcast voice signal. Subsequently, the second node router 11-B would further transmit the broadcast voice signal out, so as to make the third node router 11-C and the second mobile device 12-B adjacent to the second node router 11-B be capable of receiving the broadcast voice signal. Eventually, the third node router 11-C would transmit the broadcast voice signal out, such that the third mobile device 12-C adjacent to the third node router 11-C receives the broadcast voice signal.

Figure 6A:
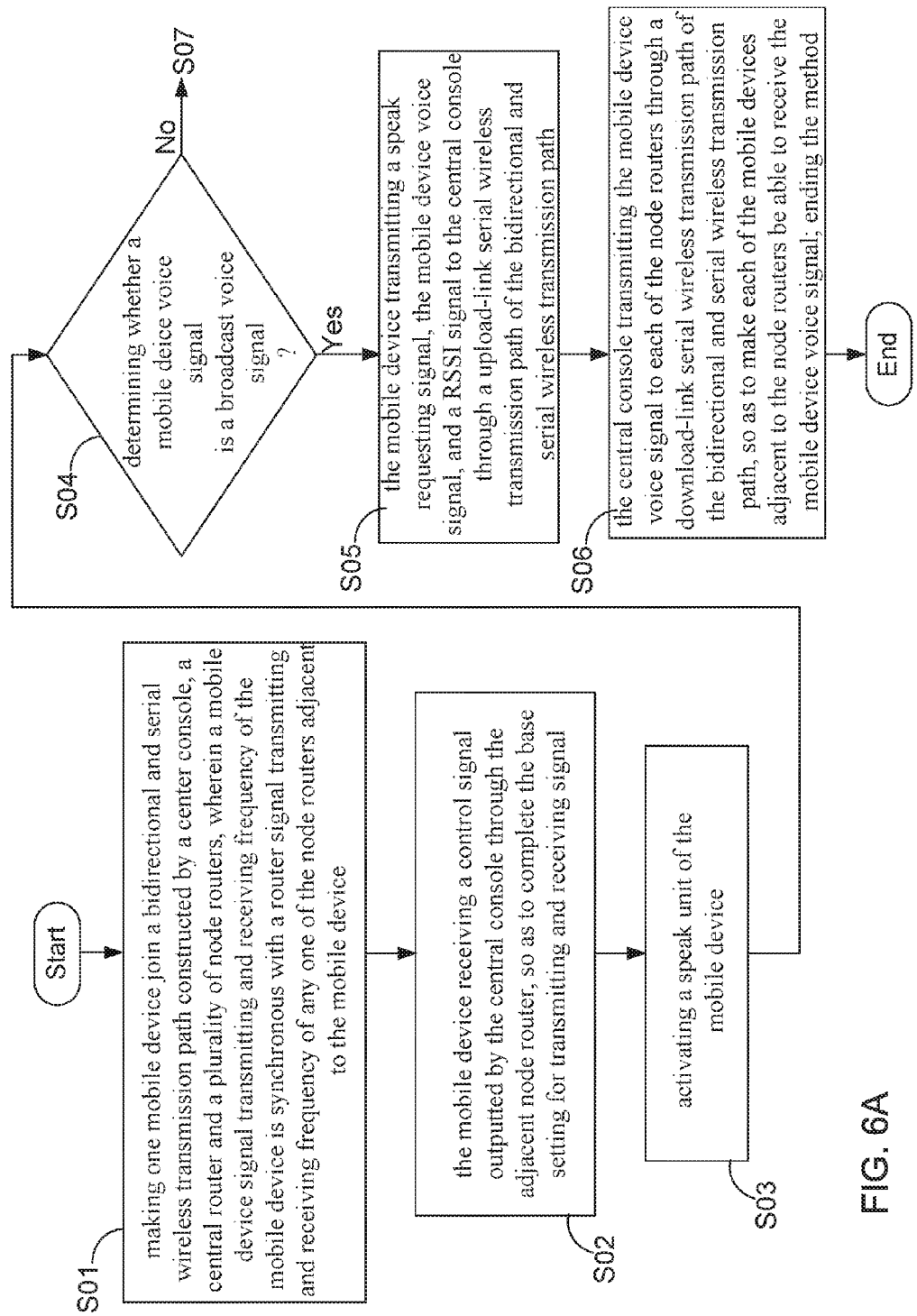
FIGS. 6A and 6B are flow charts of a bidirectional voice transmission method according to the present invention.
Figure 6B:
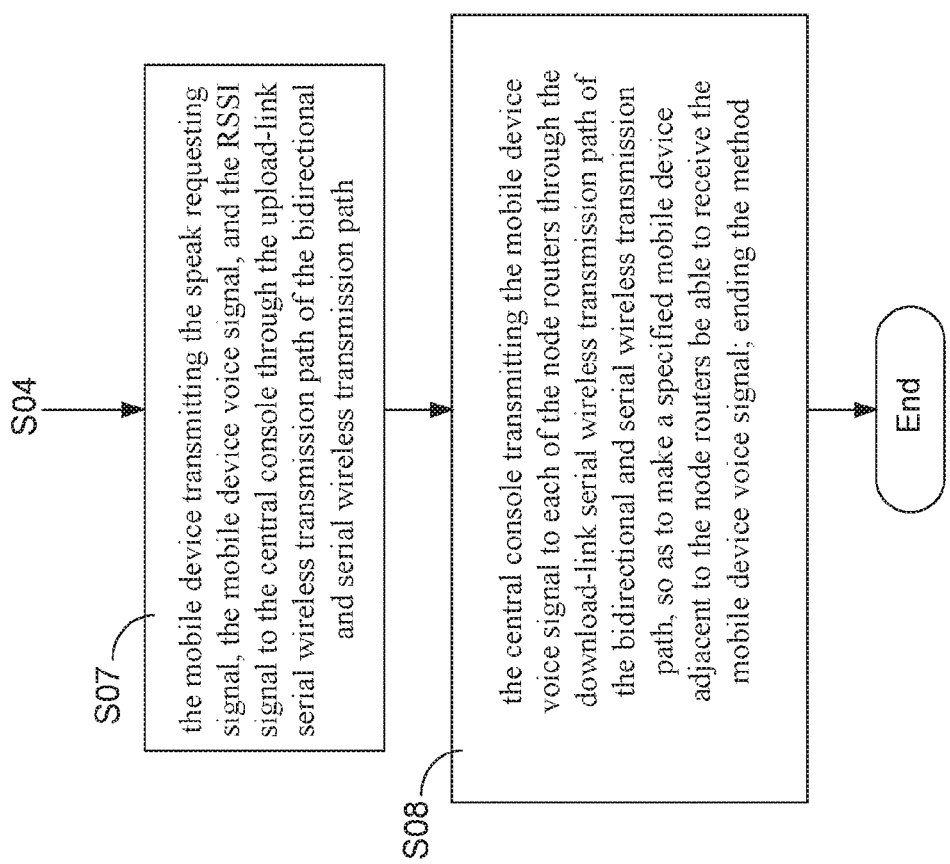
Figure 7A:
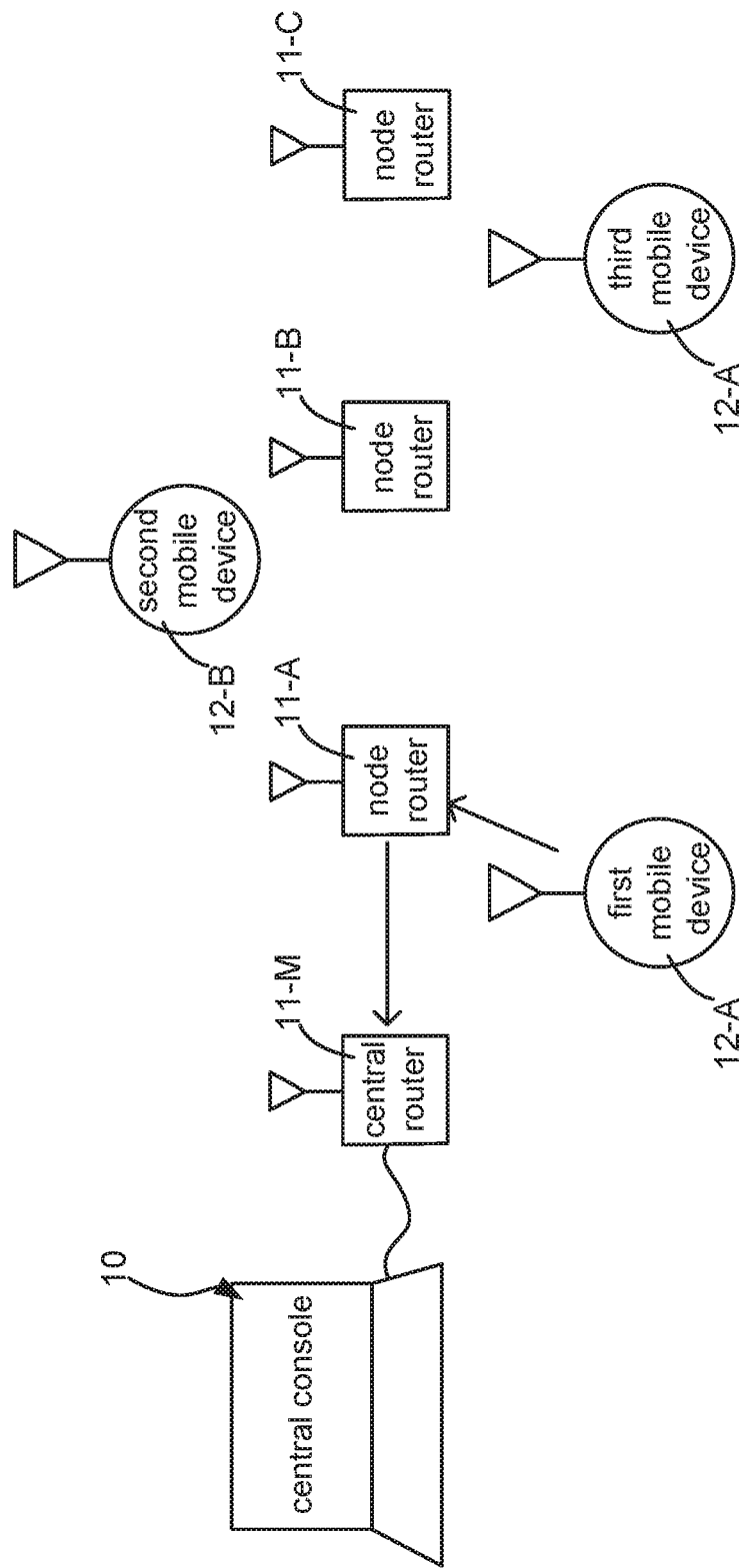
FIGS. 7A, 7B and 7C are framework views of the bidirectional voice transmission system corresponding to the bidirectional voice transmission method.
Figure 7B:
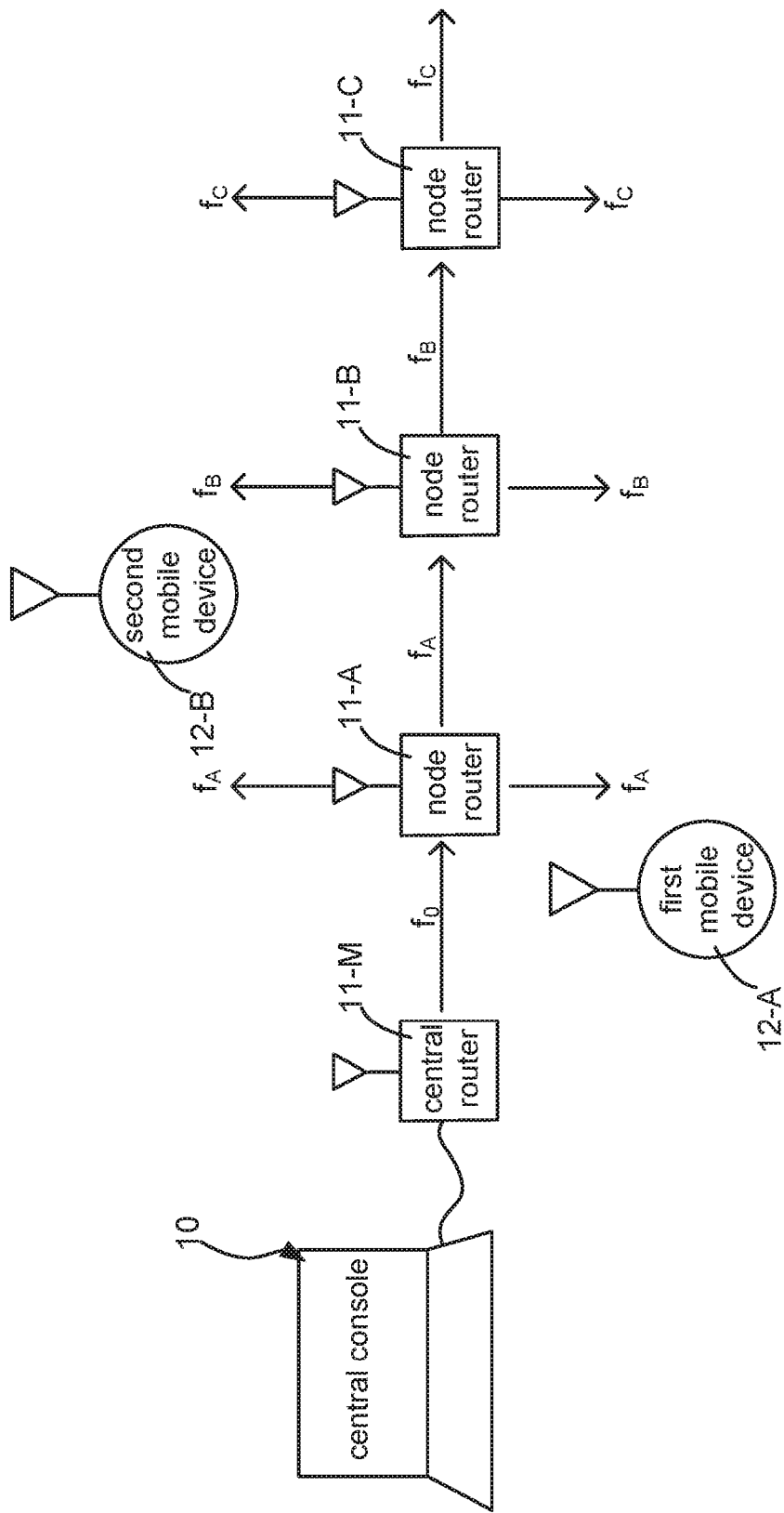
Figure 7C:
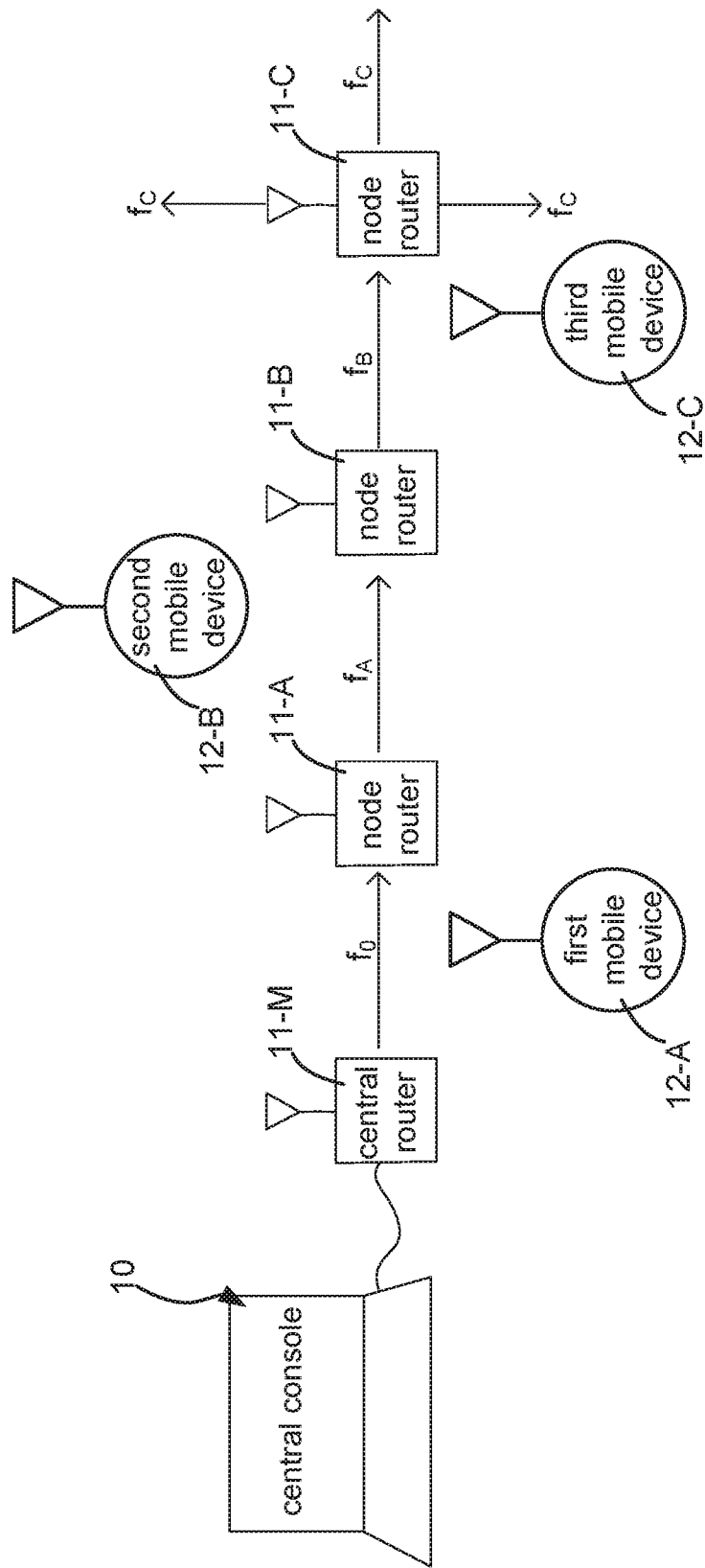

Next, please refer to FIG. 6A and FIG. 6B, there are shown flow charts of a bidirectional voice transmission method according to the present invention; moreover, please simultaneously refer to FIGS. 7A, 7B and 7C, which depict the framework views of the bidirectional voice transmission system corresponding to the bidirectional voice transmission method. As shown in FIG. 6A and FIG. 6B, the bidirectional voice signal transmission method applied in the bidirectional voice signal transmission system 1 mainly includes 7 steps of:

Firstly, as shown in FIG. 7A, the method proceeds to step (S01) for making one mobile device 12 (such as the first mobile device 12-A) join a bidirectional and serial wireless transmission path constructed by a center console 10, a central router 11-M and a plurality of node routers 11, wherein a mobile device signal transmitting/receiving frequency of the mobile device 12 is synchronous with a router signal transmitting/receiving frequency of any one of the node routers 11 (such as) adjacent to the mobile device 12.

Continuously, in step (S02), the first mobile device 12-A receives a control signal outputted by the central console 10 through the adjacent first node router 11-A, so as to complete its base setting for transmitting and receiving signal. In the present invention, when a user activating a speak unit 122 of the first mobile device 12-A (step (S03)), the user is able to decide whether make the first mobile device 12-A output a mobile device voice signal by broadcasting or not. Therefore, the method proceeds to step (S04) for determining whether the mobile device voice signal is a broadcast voice signal, if yes, proceeding to step (S05). In step (S05), the first mobile device 12-A transmits a speak requesting signal, the mobile device voice signal, and a RSSI (Received signal strength indication) signal to the central console 10 through a upload-link serial wireless transmission path UL of the bidirectional and serial wireless transmission path; subsequently, as shown in FIG. 7B, the central console 10 transmits the mobile device voice signal to each of the node routers (11-A、11-B、11-C) through a download-link serial wireless transmission path DL of the bidirectional and serial wireless transmission path in step (S06), so as to make each of the mobile devices (12-B、12-C) adjacent to the node routers 12 be able to receive the mobile device voice signal. Particularly, in the present invention, the first mobile device 11-A transmits the mobile device voice signal to the central console 10 by a CSMA/CA (Carrier Sense Multiple Access with Collision Avoidance) network protocol. Moreover, when the first mobile device 12-A transmits the mobile device voice signal to the central console 10, the RSSI (Received signal strength indication) signal, a sensing signal, a mobile device position, and a router position are transmitted out by the mobile device at the same time.

For the step (S04), if the determination result is "no", the method proceeds to step (S07). In the step (S07), the first mobile device 12-A transmits the speak requesting signal, the mobile device voice signal, and the RSSI signal to the central console through the upload-link serial wireless transmission path UL of the bidirectional and serial wireless transmission path. Eventually, in step (S08), the central console 10 transmitting the mobile device voice signal to each of the node routers (11-A、11-B、900 11-C) through the download-link serial wireless transmission path DL of the bidirectional and serial wireless transmission path, so as to make a specified mobile device (For example, the third mobile device 12-C) adjacent to the node routers 11 be able to receive the mobile device voice signal.

Herein, it needs to further explain that, for the aforesaid method, when the node routers 11 does not transmit signal, the node routers 11 must be a signal-receiving state under. In addition, as shown in FIG. 3, the mobile device 11 further includes an emergency unit 123, such that the central console 10 is able to rapidly confirm the real position of the mobile device 12 by the RSSI signal after the emergency unit 123 is activated by the user to be rescued. Therefore, the bidirectional voice signal transmission system 1 of the present invention can also be applied in a wild rescue field.

Thus, through above descriptions, the bidirectional voice transmission system and the method thereof according to the present invention have been introduced completely and clearly; in summary, the present invention includes the advantages of:

1. In the present invention, the system timing of the system is divided into three time slots for carrying a control signal, a broadcast voice signal and a mobile device voice signal outputted by a mobile device; by such design of system timing, the bidirectional voice transmission system is able to carry out the signal transmission by way of frequency frogging, so as to effectively avoid the signal interference from occurring between any two different signal transmitting and receiving devices.

2. Moreover, in the present invention, a bidirectional and serial wireless transmission path is constructed by a center console 10, a central router 11-M and a plurality of node routers 12, and the bidirectional and serial wireless transmission path includes a unload-link serial wireless transmission path and a download-link serial wireless transmission path. Besides, all of the mobile devices 12 can be easily added into the bidirectional voice transmission system 1 by way of dynamic building, without using any specific communication interface.

3. The most important is that, the number of node routers 11 can be expanded to about 65,000 in order to apply the bidirectional voice transmission system 1 in a huge range network communication or a wild rescue field.

Besides, all of the mobile devices can be added into the bidirectional voice transmission system by way of dynamic building, without using any specific communication interface. The most important is that, the number of node routers can be expanded to about 65,000 in order to apply the bidirectional voice transmission system in a huge range network communication or a wild rescue field.

The above description is made on embodiments of the present invention. However, the embodiments are not intended to limit scope of the present invention, and all equivalent implementations or alterations within the spirit of the present invention still fall within the scope of the present invention.

What is claimed is:

1. A bidirectional voice signal transmission system, comprising:
   a center console;
   a central router, being coupled to the center console for transmitting a broadcast voice
   signal and a control signal received from the center console by a base frequency;
   a plurality of node routers, wherein a bidirectional and serial wireless transmission path
   is constructed by the center console, the central router and the node routers, such that the center console is able to transmit the control signal to each of the node routers for carrying out the setting and management of the node routers through a download-link serial wireless transmission path of the bidirectional and serial wireless transmission path; therefore, a first node router of the node routers can receive the broadcast voice signal transmitted by the central router, so as to transmit the broadcast voice signal transmitted to a second node router of the node routers by a first frequency; moreover, the second node router transmitting the broadcast voice signal transmitted to a third
   node router of the node routers by a second frequency; and
   a plurality of mobile devices, locating in a signal-covering range of the node routers,
   and at least having a registering unit and a speaking unit;
   wherein when one of the plurality of mobile devices is adjacent to any one of the node
   routers, the mobile device outputs a register application to the a central console by activating the registering unit, so as to make the mobile device be permitted joining the bidirectional and serial wireless transmission path; moreover, the mobile device broadcasts a mobile device voice signal or transmits the mobile device voice signal to a specified mobile device through the bidirectional and serial wireless transmission path: wherein when the mobile device voice signal is transmitted to the central console, a RSSI (Received signal strength indication) signal, a sensing signal, the mobile device position, and the router position being transmitted out by the mobile device at the same time.

2. The bidirectional voice signal transmission system of claim 1, wherein a system timing of the bidirectional voice signal transmission system is divided into three time slots for carrying the control signal, the broadcast voice signal and the mobile device voice signal; moreover, the central console selecting at least two frequencies from a system bandwidth for alternatively being as the base frequency.

3. The bidirectional voice signal transmission system of claim 2, wherein a central console position, a mobile device position and a node router position are defined by the central console, and the mobile device transmitting the mobile device voice signal to the central console by a CSMA/CA (Carrier Sense Multiple Access with Collision Avoidance) network protocol.

4. The bidirectional voice signal transmission system of claim 1, wherein the mobile device further comprises an emergency unit, such that the central console is able to immediately confirm the real position of the mobile device by the RSSI signal after the emergency unit is activated.

5. The bidirectional voice signal transmission system of claim 1, wherein the wireless transmission mode used by the bidirectional and serial wireless transmission path is selected from the group consisting of: WIFI, Bluetooth and ZigBee.

6. The bidirectional voice signal transmission system of claim 1, wherein the mobile device is selected from the group consisting of: mobile phone, wireless intercom, tablet PC, and notebook.

7. The bidirectional voice signal transmission system of claim 1, wherein the central console is selected from the group consisting of: computer host, notebook, satellite communication vehicle, base station, and cloud server.

8. The bidirectional voice signal transmission system of claim 1, wherein when the node routers do not transmit a signal, the node routers must be in a signal-receiving state.

* * * * *